(12) United States Patent
Kaneko

(10) Patent No.: US 6,825,902 B2
(45) Date of Patent: Nov. 30, 2004

(54) TRANSFLECTIVE LIQUID CRYSTAL DISPLAY DEVICE

(75) Inventor: Yasushi Kaneko, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 103 days.

(21) Appl. No.: 09/908,731

(22) Filed: Jul. 20, 2001

(65) Prior Publication Data

US 2002/0145689 A1 Oct. 10, 2002

(30) Foreign Application Priority Data

Jul. 21, 2000 (JP) .......................................... 2000-220116
Jul. 3, 2001 (JP) .......................................... 2001-201522

(51) Int. Cl.[7] .............................................. G02T 1/1335
(52) U.S. Cl. ........................................ 349/114; 349/119
(58) Field of Search .......................... 349/113–114, 117, 349/119

(56) References Cited

U.S. PATENT DOCUMENTS 6,292,240 B1 * 9/2001 Kamiya et al. ................ 349/84
6,380,995 B1 * 4/2002 Kim ............................ 349/113
6,456,347 B1 * 9/2002 Motomura et al. .......... 349/117
6,476,889 B2 * 11/2002 Urabe et al. ................. 349/106
6,493,051 B2 * 12/2002 Ha et al. ...................... 349/113

FOREIGN PATENT DOCUMENTS

| JP | 4-97121 | 3/1992 |
| JP | 10-123505 | 5/1998 |
| JP | 10-282488 | 10/1998 |

* cited by examiner

Primary Examiner—Toan Ton
(74) Attorney, Agent, or Firm—Westerman, Hattori, Daniels & Adrian, LLP

(57) ABSTRACT

A transflective liquid crystal display device comprising a liquid crystal element (20) composed of nematic liquid crystal (6) sandwiched between a first substrate (1) and a second substrate (2), and a transflective layer (7) installed on the inside of the first substrate (1), a first polarizing film (11) disposed on the outside of the second substrate (2) of the liquid crystal element, a second polarizing film (17) and a backlight (16), disposed in sequence on the outside of the first substrate (1) wherein the transflective layer (7) is a thin film of metal such as aluminum, having transparent portions (9) formed by means of anodic oxidation.

18 Claims, 6 Drawing Sheets

TRANSFLECTIVE LIQUID CRYSTAL DISPLAY DEVICE

BACKGROUND OF THE INVENTION

1. Field of the Invention

The present invention relates to a liquid crystal display device, and in particular to a transflective liquid crystal display incorporating a transflective reflector inside a liquid crystal element thereof, capable of effecting bright display in black and white or in color in the case of either reflective display utilizing external light or transmissive display by backlighting.

2. Description of the Related Art

For a conventional reflection-type liquid crystal display device, there is in use mainly a liquid crystal display device of a constitution wherein a TN (twisted nematic) liquid crystal element or an STN (supertwisted nematic) liquid crystal element is disposed between a pair of polarizing films, and a reflective layer is installed on the outside of one of the polarizing films.

With the reflection-type liquid crystal display device of such a constitution, external light entering through one of the polarizing films from the visible side of the device is either absorbed by the other of the polarizing films or transmitted therethrough and reflected by the reflective layer installed on the outside thereof, going out towards the visible side after passing through again the liquid crystal element and the pair of the polarizing films, thereby effecting reflective display, depending on whether or not the direction of polarization of the external light is rotated when passing through the liquid crystal element.

That is, the external light entering from the visible side passes through two sheets of the polarizing films before reaching the reflective layer, and reflected light of the external light goes out towards the visible side after passing through again the two sheets of the polarizing films, thereby effecting white display, so that magnitude of light attenuation by the agency of the polarizing films increases, resulting in deterioration of brightness of images in display.

Moreover, since the reflective layer is installed on the outside of a glass substrate of the liquid crystal element, there arises a problem that shadows come to appear on display.

To cope with these problems, a single polarizing film reflection-type liquid crystal display device, capable of effecting display with just one sheet of polarizing film, has since been proposed. With such a liquid crystal display device having one sheet of polarizing film, brightness of images in display can be improved in comparison with that for the case of the conventional reflection-type liquid crystal display device employing the two sheets at the polarizing films. Further, with the single polarizing film reflection-type liquid crystal display device, a reflective layer is formed inside a liquid crystal element, thereby enabling the problem of the shadows appearing on display to be solved.

Such a single polarizing film reflection-type liquid crystal display device is composed of one sheet of polarizing film, one sheet of retardation film, and at liquid crystal element incorporating a reflective layer, as disclosed in, for example, JP, 04-97121, A. Further, a single polarizing film reflection-type liquid crystal display device employing an optical compensatory element having a structure twisted in the direction opposite to the twist direction of a liquid crystal layer in place of a retardation film is also disclosed in, for example, JP 10-123505, A.

With such conventional single polarizing film reflection-type liquid crystal display devices as described above, however, it is not possible to install a backlight because the reflective layer does not allow light to pass therethrough so that it has not been possible to see display at places where external light is dim or at night.

Accordingly, there has been developed a transflective liquid crystal display device, employing a transflective layer serving as a half-mirror, made up of a very thin aluminum film with thickness in a range of 0.01 to 0.03 $\mu$m, formed by the vapor deposition method or the sputtering method as a reflective layer, or employing a transflective layer provided with an opening every pixel by use of photoetching method as a reflective layer. As a result, display can be effected by lighting up a built-in backlight of the liquid crystal display device at places where external light is dim or at night.

However, in the case of using a thin metal film for the half-mirror, significant variation in transmittance of the transflective layer occurs depending on the thickness thereof, and there will be an increase in fluctuation of transmittance as well as reflectance of the transflective layer at the time of production. For these reasons, such a transflective liquid crystal display device as described has a drawback in that large dispersion will occur in brightness of images in the case of reflective display utilizing external light, and in luminance in the case of transmissive display by backlighting.

A liquid crystal display device employing a transflective layer provided with an opening for every pixel has been disclosed in, for example, JP, 10-282488, A.

However, with such a liquid crystal display device as described above, a reflective layer made up of an aluminum film is formed on top of a first substrate 1 composing a liquid crystal element, and an opening 29 is provided in regions of the reflective layer, corresponding to respective pixels, thereby forming a transflective 27 as shown in FIG. 12. The transflective layer 27 has a thickness in the order of 0.1 to 0.2 $\mu$m, and even after a planarization treatment is applied thereto by providing a protective film (top coat layer) 8, the surface of the protective film 8 and the surface of first electrodes 3 formed on top of the protective film 8 are left with differences in level of 0.05 $\mu$m or more.

Due to the differences in level, there occur a difference of 0.05 $\mu$m or more between cell gaps, which are gaps holding a liquid crystal layer sandwiched between the first substrate 1 and a second substrate (not shown) in-between, namely, between those opposite to the respective openings 29 of the transflective layer 27, and those opposite to regions thereof, other than the respective openings 29. As a result, there have been encountered cases where display unevenness, and in the worst case, alignment defect have occurred thereby degrading display quality considerably. Particularly, in the case of using and STN liquid crystal element having a twist angle in a range of 180 to 260°, there is the need for strictly controlling the cell gaps, however, in such a case, it becomes difficult to implement controlling the same, so that display unevenness tends to occur due to the difference between the cell gaps, and further, there have arisen even cases where alignment defect has occurred due to the induction domain typical of STN liquid crystal during a period of applying a driving voltage.

SUMMARY OF THE INVENTION

It is therefore an object of the invention to solve the problems described above, encountered by conventional liquid crystal liquid devices of various types and to provide a transflective liquid crystal display device capable of effecting blight reflective display utilizing external light and transmissive display by backlighting, and having less display unevenness and less alignment defect with little fluctuation in display brightness.

To this end, the transflective liquid crystal display device according to the invention comprises a liquid crystal element composed of liquid crystal sandwiched between a first substrate and a second substrate, and a transflective layer installed on the inside of the first substrate, wherein the transflective layer is a thin metal film having transparent portions formed by means of anodic oxidation.

The transflective liquid crystal display device preferably further comprises a first polarizing film disposed on the outside of the second substrate of the liquid crystal element, a second polarizing film and a backlight, disposed in sequence on the outside of the first substrate.

As a result, an untransparent portion and transparent portion of the transflective layer have substantially, the same thickness, and cell gaps in which the liquid crystals are sandwiched between the first substrate and the second substrate of the liquid crystal element are rendered uniform. Accordingly, occurrence of display unevenness and alignment defect is presented, so that bright display without unevenness and in good contrast can be effected in the case of transmissive display by backlighting as well as reflective display utilizing external light.

Further, it is desirable that the transflective layer and first electrodes are installed on the inner face of the first substrate, second electrodes are installed on the inner face of the second substrate, nematic liquid crystal of twisted alignment are used as the liquid crystal, a first optical compensatory element is disposed between the second substrate and the first polarizing film, and a second optical compensatory element is disposed between the first substrate and the second polarizing film.

Supertwisted nematic liquid crystal having a twist angle in a range of 180 to 260° may be used for the nematic liquid crystal.

With these features, pits and projections are preferably provided on the surface of an untransparent portion of the transflective layer, thereby rendering to form a scattering layer. Or a light scattering layer may be installed on the outside of the second substrate of the liquid crystal element.

The first optical complementary element can be composed of one sheet of retardation film, or a plurality of sheets of retardation films. Otherwise, the first optical compensatory element may be composed of one sheet of twisted retardation film, or a twisted retardation film and one sheet of retardation film or a plurality of sheets of retardation films.

Color display can be effected by installing color filters in a plurality of colors on either the first substrate or the second substrate of the liquid crystal element.

A thin aluminum film provided with transparent portions made of aluminum oxide is preferably employed as the transflective layer. Further, an oxide film formed by anodic oxidation is preferably provided on the untransparent portion of the transflective layer.

Since crossover points of the first electrodes and the second electrodes, opposed to each other, respectively, inside the liquid crystal element, constitute respective pixels, the transparent portions of the transflective layer are desirably provided at positions corresponding to the respective pixels. Each of the transparent portions of the transflective layer, formed in a slit shape, may be provided at positions corresponding to a plurality of pixels in succession, respectively.

An area ratio of the transparent positions to the transflective layer is preferably in a range of 5 to 30%, and in particular, the area ratio in a range of 10 to 25% is desirable.

By installing a protective film formed of a transparent and insulating material between the transflective layer and the first electrodes, provided on the first substrate of the liquid crystal element, the surface of the transflective layer can be rendered more flatter, and the transflective layer can be insulated from the first electrodes.

The above and other objects, features, advantages of the invention will be apparent from the following detailed description which is to be read in conjunction with the accompanying drawings.

DETAILED DESCRIPTION OF THE PREFERRED EMBODIMENTS

Preferred embodiments of a transflective liquid crystal display device according to the invention are described hereinafter with reference to the accompanying drawings.

First Embodiment: FIGS. 1 to 6

Figure 1:
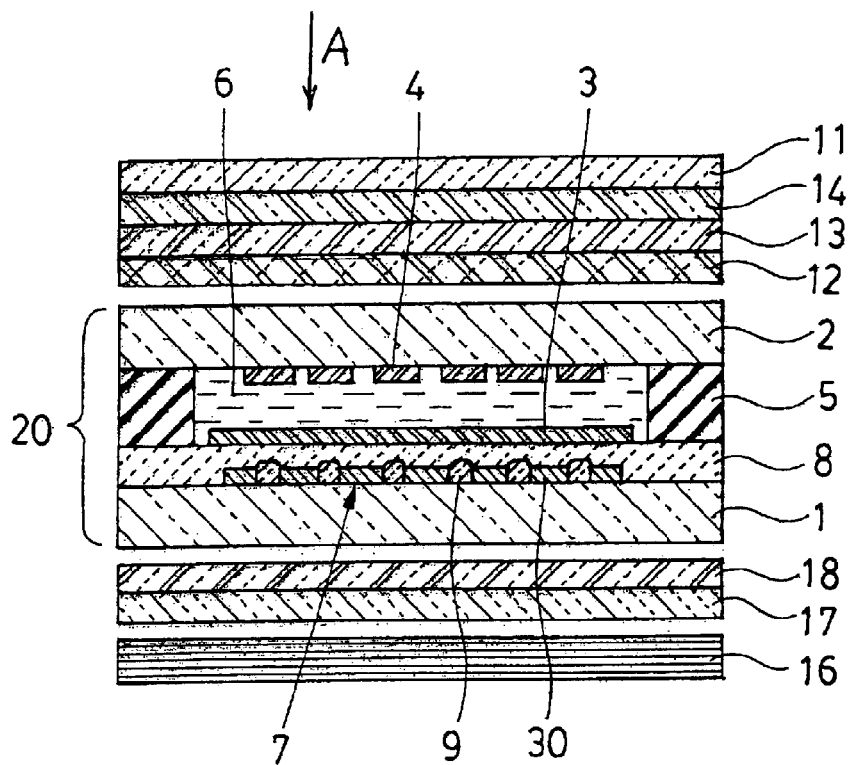
FIG. 1 is a schematic sectional view showing the constitution of a first embodiment of a transflective liquid crystal display device according to the invention.

First, a first embodiment of a transflective liquid crystal display device according to the invention is described with reference to FIGS. 1 to 6. FIG. 1 is a schematic sectional view showing a constitution of the transflective liquid crystal display device, wherein for the sake of convenience in illustration, there are shown pixels far less in numbers than the actual number, and respective elements of the device with their dimension thicknesswise considerably enlarged.

Figure 2:
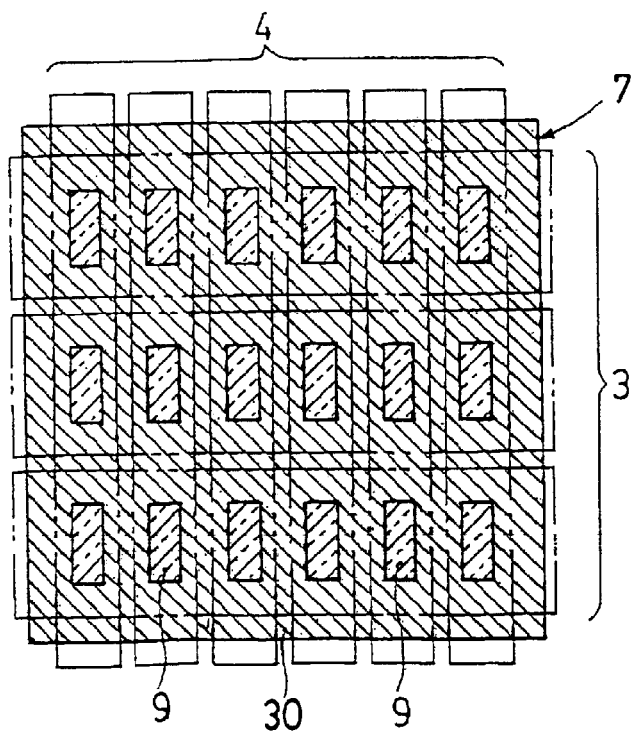
FIG. 2 is a plan view showing a transflective reflector of the transflective liquid crystal display device shown in FIG. 1 together with a planar configuration of first electrodes and second electrodes.

FIG. 2 is a plan view showing a taransflective layer of the transflective liquid crystal display device together with a planar configuration thereof with first electrodes and second electrodes, wherein the transflective layer is provided with the same hatch as that in FIG. 1 for clarity although FIG. 2 is not a sectional view.

Figure 3:
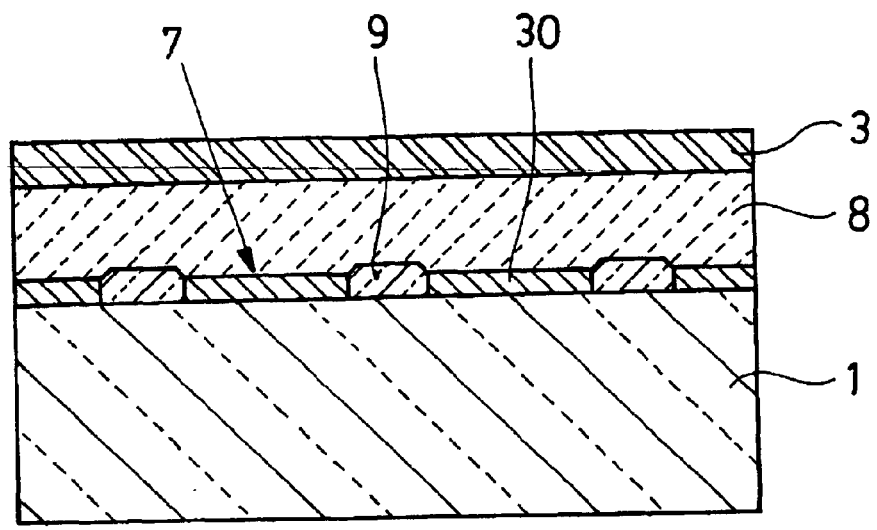
FIG. 3 is a partially enlarged sectional view showing only a part of the transflective liquid crystal display device shown in FIG. 1, on the side of a first substrate.

FIG. 3 is a partially enlarged sectional view showing only a part of the transflective liquid crystal display device shown in FIG. 1 on the side of a first substrate composing a liquid crystal element thereof.

As shown in FIG. 1, the liquid crystal display device according to the first embodiment is composed of a liquid crystal element 20, a twisted retardation film 12, a first retardation film 13, and a second retardation film 14, which constitute a first optical compensatory element disposed on the visible side (the upper side in FIG. 1, the arrow A indicating the direction of the visible side) of the liquid crystal element 20, a first polarizing film 11 disposed on the visible side of the second retardation film 14, and a third retardation film 18 which is a second optical compensatory element, a second polarizing film 17, and a backlight 16, which are disposed on the side (the underside in FIG. 1) of the liquid crystal element 20, opposite from the visible side thereof.

The first polarizing film 11, the second retardation film 14, the first retardation film 13 and the twisted retardation film 12 are integrally joined together with an acrylic adhesive, and the twisted retardation film 12 is bonded to the upper face of the liquid crystal element 20 with an acrylic adhesive.

Further, the second polarizing film 17 and the third retardation film 18 are also integrally joined together with an acrylic adhesive, and the third retardation film 18 is bonded to the underside of the liquid crystal element 20 with an acrylic adhesive.

The liquid crystal element 20 is an STN liquid crystal element composed of the first substrate 1 and a second substrate 2, made up of a transparent class sheet 0.5 mm thick, respectively and coupled together with a sealant 5 keeping a predetermined spacing therebetween, and nematic liquid crystals 6 twisted through 240° counterclockwise which are held in a gap between the first substrate 1 and the second substrate 2.

On the inner face of the first substrate 1 disposed on the side of the liquid crystal element 20, opposite from the visible side thereof, there are installed a transflective layer 7 made up of an aluminum film of 0.1 $\mu$m thick, a protective film 8 of 2 $\mu$m thick made of an acrylic material, covering the transflective layer 7, and first electrodes 3 made of ITO which is a transparent and electrically conductive material, patterned in stripes, as shown by phantom lines in FIG. 2. Further, on the inner face of the second substrate 2 disposed on the visible side of the liquid crystal element 20, there are formed second electrodes 4 also made of ITO, patterned in stripes in such a way as to cross the first electrodes 3 at right angles as shown by phantom lines in FIG. 2.

As shown in FIG. 2, crossover points of the first electrodes 3 and the second electrodes 4, opposed to each other, respectively, constitute respective pixels, and the transflective layer 7 is formed throughout a display region composed of the respective pixels. The transflective layer 7 is provided with transparent portions 9 rectangular in shape each formed at positions corresponding to the center of the respective pixels. Further, on the surface of an untransparent portion 30 of the transflective layer 7, there are provided pits and projections at a pitch ranging from several $\mu$m to several tens of $\mu$m, thereby rendering to form a scattering reflection layer (not shown in the figure). With the transflective layer 7 having the scattering reflection layer formed (on the surface thereof, excellent display can be effected with hardly any defects of characters which is dependent on scattering of light.

A method of forming the transflective layer 7 is described hereinafter.

A treatment for providing pits and projections is applied to the surface of the first substrate 1 and an aluminum film of 0.1 $\mu$m thick is formed on the surface thereof by the sputtering method. The aluminum film is provided with fine pits and projections (not shown) on the surface thereof, formed in such a way as to correspond to the pits and projections on the surface of the first substrate 1.

Photoresist is applied onto the aluminum film, and dried. Thereafter, the openings for forming the transparent portions, each formed at the positions corresponding to the center of the respective pixels, are provided in the photoresist by applying exposure and development treatments thereto using a photomask. Then, anodic oxidation is carried out in diluted solution of ammonium phosphate by applying a voltage in a range of 50 to 100V, and thereby only portions of the aluminum film, corresponding to the respective openings of the photoresist, are subjected to anodic oxidation, being turned into a aluminum oxide ($Al_2O_3$) film. If the aluminum film is thicker than 0.2 $\mu$m at this point in time, it will take much time to turn the portions of the aluminum film as described above into a fully transparent aluminum oxide film, and therefore, the aluminum film serving as the transflective layer is preferably formed to a thickness of 0.2 $\mu$m or less.

Subsequently, upon removal of the photoresist, there is obtained the transflective layer 7 provided with the transparent portions 9 rectangular in shape, each formed at the positions corresponding to the center of the respective pixels, as shown in FIGS. 2 and 3.

As shown in FIG. 3, the transparent portions 9 made of aluminum oxide have a thickness slightly thicker than that for the untransparent portion 30 to the extent of oxygen added. However, since such a difference in thickness is very minimal, the transparent portions 9 and the untransparent portion 30 of the transflective layer 7 have substantially the same thickness, and there occurs hardly any difference in level on the top thereof if the protective film 8 is formed thereon. The protective film 8 is formed of a transparent and insulating material such as acrylic resin.

Figure 4:
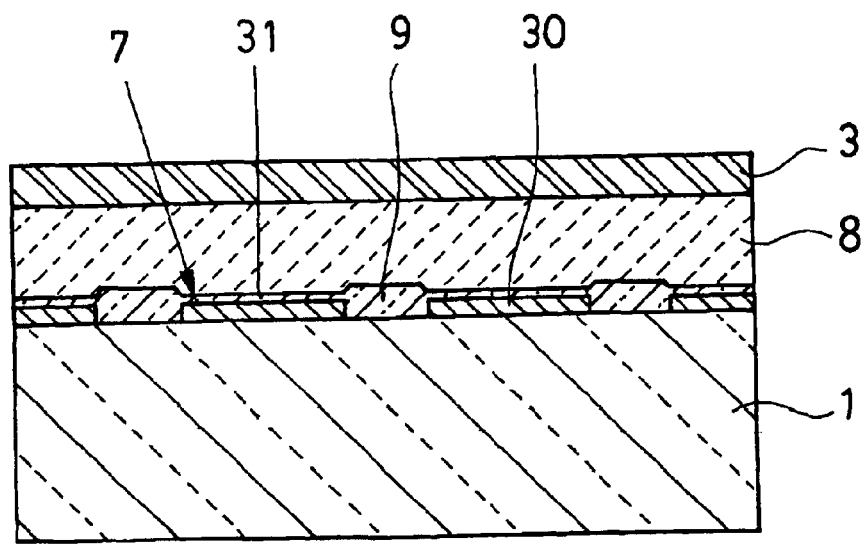
FIG. 4 is a partially enlarged sectional view similar to FIG. 3, showing a variation.

Further, as shown in FIG. 3, the protective film 8 may be formed directly on top of the transflective layer 7, however, after the transparent portions 9 are formed in the transflective layer 7, anodic oxidation may be carried out again by applying a voltage in a range of 10 to 20V in order to protect the surface of the aluminum film of the transflective layer 7, and, as shown in FIG. 4, a thin oxide film 31 may be formed on top of portions of the transflective layer 7 other than the transparent portions 9, that is, the untransparent portion 30 thereof as well.

With the transflective layer 7, the untransparent portion 30 is formed so as to surround the respective transparent portions 9, and consequently, the greater an area of the transparent portions 9, the brighter display becomes at the time of transmissive display when the backlight is lit up, but conversely, display becomes darker at the time of reflective display. Various samples of the transflective layer 7 having different area ratios of the respective transparent portions 9 were prepared on a trial basis, and evaluation was made on images displaced by liquid crystal display devices employing those samples of the transflective layer 7, whereupon it has turned out that an area ratio of the transparent portions 9 to the transflective layer 7 in a range of 5 to 30% is preferable, and the area ratio in a range of 10 to 25% is more preferable. For example, it the area ratio of the transparent portions 9 to the transflective layer 7 is 20%, it follows that the liquid crystal element 20 allows about 20% of light to pass therethrough, reflecting remaining 80% of light.

Accordingly, with the present embodiment, about 20% was adopted as the area ratio of the respective transparent portions 9 of the transflective layer 7, so that reflective display became bright, and excellent image quality was also obtained at the time of transmissive display by backlighting.

For the twisted retardation film 12, use is made of a film obtained by applying a polymer of liquid crystallinity having a twist structure to a triacetylcellulose (TAC) film or a polyethylene terephthalate (PET) film to which an alignment treatment has been applied, adjusting a twist angle thereof after turning the same into a liquid crystal state by heating at a high temperature on the order of 150° C., and subsequently, rapidly cooling the same to room temperature, thereby fixing a twisted condition thereof.

Otherwise, for the twisted retardation film 12, use may be made of a film formed by applying a polymer of liquid crystallinity to a film for use in alignment to which an alignment treatment has been applied, and subsequently, transferring the polymer of liquid crystallinity from the film for use in alignment to a TAC film prepared separately, after fixing a twisted condition thereof. With the present embodiment, use is made of the twisted retardation film 12 twisted clockwise, having a twist angle Tc of −240°, and Rc of 0.80 $\mu$m, which is Δnd value indicating birefringent tendency.

The first polarizing film 11 is an absorption-type polarizing film having the transmission axis, and the absorption axis orthogonal thereto, transmitting the light linearly polarized in the direction parallel to the transmission axis thereof while absorbing, the light linearly polarized in the direction parallel to the absorption axis thereof. The first polarizing film 11 is preferably as bright as possible, and has a high degree of polarization. With the present embodiment the polarizing film having a transmittance of 45% and a degree of polarization of 99.9% is employed.

If a non-reflection layer having reflectance on the order of 0.5% is formed by coatings the surface of the first polarizing film 11 with inorganic thin films in a plurality of layers, each having a different refractive index, by the vapor deposition method or the sputtering method, a surface reflectance of the first polarizing film 11 becomes lower and a transmittance thereof is enhanced. As a result, display becomes brighter, and contrast is improved because a blackness level is lowered.

The first retardation film 13 is a transparent film of about 70 $\mu$m thick, formed by drawing polycarbonate (PC), and has a retardation value F1 of 0.14 $\mu$m at a wavelength of 0.55 $\mu$m, equivalent to a quarter-wavelength. The second retardation film 14 is also a transparent film of about 70 $\mu$m thick, formed by drawing polycarbonate, and is set to have a retardation value F2 of 0.28 $\mu$m at a wavelength of 0.55 $\mu$m, equivalent to a half-wavelength.

Further, the third retardation film 18 is also a transparent film of about 70 $\mu$m thick, formed by drawing polycarbonate, and has a retardation value F3 of 0.14 $\mu$m at a wavelength of 0.55 $\mu$m, which is a quarter-wavelength plate.

The second polarizing film 17 is also an absorption-type polarizing film, and it is important that the same has a high degree of polarization. With the present embodiment, the second polarizing film 17 having a transmittance of 44% and a degree of polarization of 99.99% is employed.

For the backlight 16, an optical guide sheet with a fluorescent lamp or an LED attached thereto, an electroluminescence (EL) sheet and so forth can be used. With the present embodiment, however, an EL sheet of about 1 mm thick emitting white light is employed.

Now, the planar configuration among respective constituent members of the liquid crystal display device according to the present embodiment is described hereinafter with reference to FIGS. 5 and 6.

Figure 5:
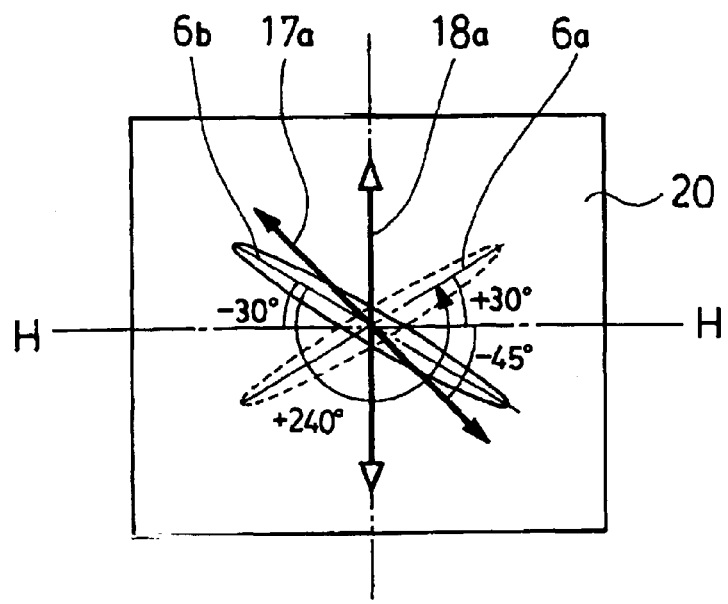
FIG. 5 is a schematic illustration showing a planar configuration among a liquid crystal element, a second polarizing film and a third retardation film of the transflective liquid crystal display device shown in FIG. 1.
Figure 6:
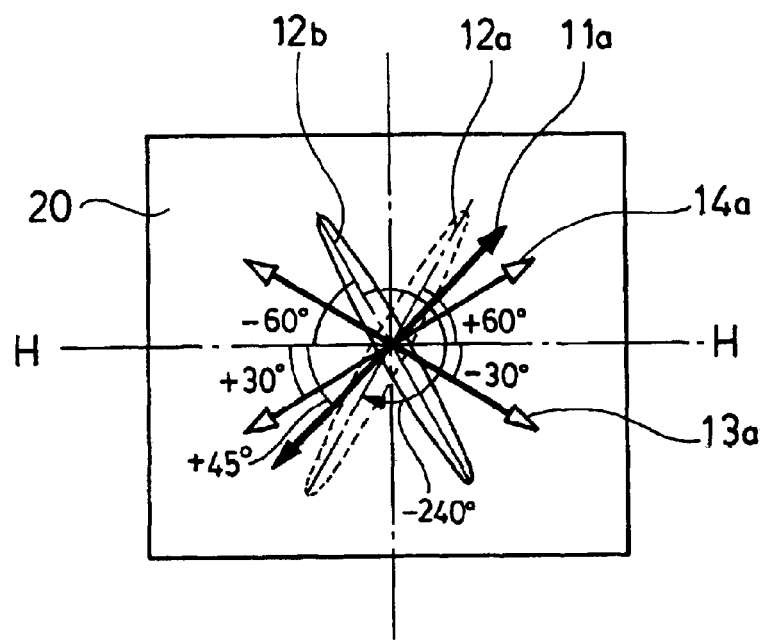
FIG. 6 is a schematic illustration similar to FIG. 5, showing a planar configuration among a first polarizing film, first and second retardation films, and a twisted retardation film.

FIG. 5 shows a configuration between the liquid crystal element 20 and the constituent members disposed on the side (the underside in FIG. 1) of the liquid crystal element 20, opposite from the visible side thereof, and FIG. 6 shows a configuration between the constituent members disposed on the visible side (the topside in FIG. 1) of the liquid crystal element 20. As for plusses and minuses used in designating angles as described hereinafter, a direction counterclockwise relative to the horizontal axis is designated as plus (+) while a direction clockwise relative to the horizontal axis is designated as minus (−).

An alignment film (not shown) is formed on the surface of the first substrate 1, the first electrodes 3, the second substrate 2 and the second electrodes 4 of the liquid crystal element 20 shown in FIG. 1. As shown in FIG. 5, an alignment direction 6a of liquid crystal molecules in the lower part of the nematic liquid crystal 6 points at +30° by applying a rubbing treatment in a direction extending upward to the right at 30° relative to the horizontal axis H—H of the liquid crystal element 20 on the side of the first substrate 1, respectively. On the other hand, an alignment direction 6b of liquid crystal molecules in the upper part of the nematic liquid crystal 6 points at −30° by applying a rubbing treatment in a direction extending downward to the right at 30° relative to the horizontal axis H—H of the liquid crystal element 20 on the side of the second substrate 2. An optical rotatory substance called chiral is added to the nematic liquid crystal 6 having viscosity at 20 cp. and a twist pitch P thereof is adjusted to be at 11 $\mu$m, thereby constituting the STN liquid crystal element 20, having a twist angle Ts of 240° counterclockwise.

A refractive index difference Δn of the nematic liquid crystal 6 in use is 0.15, and a cell gap d, that is, a gap in which the nematic liquid crystal 6 are sandwiched between the first substrate 1 and the second substrate 2, is set at 5.6 $\mu$m. Accordingly, if a value to indicate birefringent tendency of the liquid crystal element 20 as expressed by Δnd, that is, the product of the refractive index difference Δn of the nematic liquid crystal 6 and the cell gap d, is designated Rs, the value Rs is 0.84 $\mu$m.

Meanwhile, as shown in FIG. 6, the first polarizing film 11 is disposed such that a transmission axis 11a thereof is at an angle of +45° on the basis of the horizontal axis H—H of the liquid crystal element 20. The twisted retardation film 12 is disposed such that an alignment direction 12a of molecules in the lower part thereof is at an angle of +60° on the basis of the horizontal axis H—H, and an alignment direction 12b of molecules in the upper part thereof is at an angle of −60°, so that a twist angle Tc thereof becomes −240° clockwise, and if a difference in absolute value between the twist angles is designated by Δt, Δt=|Ts|−|Tc|=0°. If a difference in birefringent tendency is designated ΔR, ΔR=Rs−Rc=0.04 μm, substantially equivalent in value.

The first retardation film 13 is disposed such that a phase delay axis 13a thereof is at an angle of −30° relative to the horizontal axis H—H, and the second retardation film 14 is disposed such that a phase delay axis 14a thereof is at an angle +30° relative to the horizontal axis H—H. By disposing two sheets of the retardation films such that an intersection angles formed by respective phase delay axes becomes 60°, a retardation value made up by the two sheets of the retardation films becomes 0.14 μm for light at a wavelength of 0.55 μm, smaller than 0.14 μm for light at a wavelength shorter than that, and greater than 0.14 μm for light at a wavelength longer than that. As a result, there is made up the so-called broad band quarter-wave plate wherein a relation represented by retardation value/wavelength=¼ applies to all wavelength regions, and the effective optical axis thereof is in the direction of the horizontal axis H—H.

As shorter in FIG. 5, the third retardation film 18 disposed on the underside of the liquid crystal element 20 has a phase delay axis 18a disposed so as to be orthogonal to the horizontal axis H—H of the liquid crystal element 20, and the second polarizing film 17 is disposed such that a transmission axis 17a thereof is at an angle of −45° relative to the horizontal axis H—H so as to cross the transmission axis 11a of the first polarizing film 11 at right angles.

A liquid crystal display device having such a constitution as described is called a transflective liquid crystal display device, and is capable of effecting both reflective display utilizing external light and transmissive display by use of the backlight 16.

First, reflective display is described hereinafter. External light enters through the first polarizing film 11 from the upper visible side in FIG. 1, is turned into the light linearly polarized in the direction parallel to the transmission axis 11a of the first polarizing film 11, and is transmitted through the second retardation film 14, the first retardation film 13 and the twisted retardation film 12, composing the first optical compensatory element, so as to be turned into circularly polarized light after passing further through portions of the nematic liquid crystal 6 where no voltage is applied. The circularly polarized light undergoes a change in phase by 180° when reflected by the transflective layer 7 and is reflected as reverse-handed circularly polarized light. Thereafter, after passing again through the nematic liquid crystal 6, the twisted retardation film 12, the first retardation film 13, and the second retardation film 14, the reverse-handed circularly polarized light is turned into linearly polarized light with a direction of polarization rotated through 90° from that of incident light, so that the direction of polarization is orthogonal to the transmission axis 11a of the first polarizing film 11, and the linearly polarized light is absorbed by the first polarizing film 11, thereby effecting black display.

When a voltage is applied to the nematic liquid crystal 6, liquid crystal molecule, thereof are caused to rise, and the birefringent tendency of the nematic liquid crystal 6 is reduced by an extent equivalent to a quarter wavelength, so that total retardation of the nematic liquid crystal 6 and the first optical compensatory element is substantially eliminated. As a result, the linearly polarized light which has entered through the first polarizing film 11 arrives at the transflective layer 7 as it is after passing through portions of the nematic liquid crystal 6 where a voltage is applied, and is again transmitted through the nematic liquid crystal 6 and the first optical compensatory element composed of the twisted retardation film 12, the first retardation film 13, and the second retardation film 14, arriving at the first polarizing film 11 as the light linearly polarized in the direction identical to that of the incident light (that is in the direction parallel to the transmission axis 11a of the first polarizing film 11), and thereby passing therethrough. Thus, white display is effected.

Next, transmissive display by use of the backlight is hereinafter described. The retardation value of the third retardation film 18 is set to be substantially equivalent to a total retardation value obtained by the twisted retardation film 12, the first retardation film 13, the second retardation film 14, and the portions of the nematic liquid crystal 6 where no voltage is applied, and these constituent members are disposed at angles such that the respective retardation values described above are subtracted from that of the third retardation film 18. That is, a total retardation value from the third retardation film 18 to the second retardation film 14 is nearly zero.

Light emitted from the backlight 16 is turned into the light linearly polarized in the direction parallel to the transmission axis 17a of the second polarizing film 17 after passing therethrough, and passes through the third retardation film 18, subsequently passing through the transparent portions 9 of the transflective layer 7. In the portions of the nematic liquid crystal 6 where no voltage is applied, the light linearly polarized, even after passing through from the third retardation film 18 to the second retardation film 14, arrives as it is at the first polarizing film 11 because the total retardation value of these films is zero. Because the first polarizing film 11 is disposed such that the transmission axis 11a thereof is orthogonal to the transmission axis 17a of the second polarizing film 17, the light linearly polarized as arrived at the first polarizing film 11 is absorbed thereby, thus effecting black display.

When a voltage is applied to the nematic liquid crystal 6, liquid crystal molecules thereof are caused to rise, and a retardation value comes to be provided between the third retardation film 18 and the second retardation film 14. As a result, the light linearly polarized, transmitted through the second polarizing film 17, is turned into elliptically polarized light in the portions of the nematic liquid crystal 6 where a voltage is applied, and arrives at the first polarizing film 11, passing therethrough so that white display is effected.

Next, the advantageous effect of the transparent portions 9 provided in the transflective layer 7 is briefly described again.

As shown in FIGS. 1 to 4a the transflective layer 7 provided with the transparent portions 9 formed therein is installed on the inner face of the first substrate 1 of the liquid crystal display device according to the embodiment. The transparent portions 9 are made up of an aluminum oxide ($Al_2O_3$) film formed by applying anodic oxidation to aluminum, of which the transflective layer 7 is made, and have substantially the same thickness as that of the untransparent portion 30 of the transflective layer 7. By applying a planarization treatment to the transflective layer 7 with the protective film 8 formed of the transparent material, the surfaces of these portions become completely flat.

Figure 12:
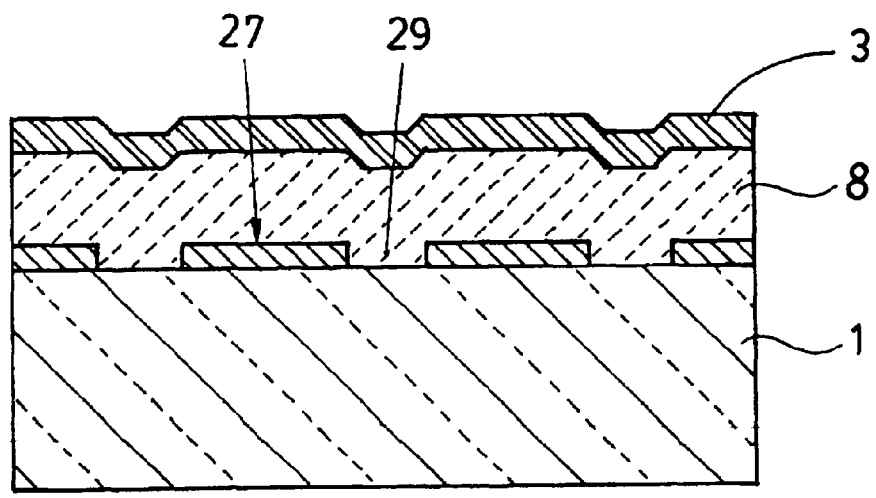
FIG. 12 is a partially enlarged sectional view showing only a part of a conventional transflective liquid crystal display device, on the side of a first substrate.

Accordingly, the cell gaps of the liquid crystal element 20 are rendered uniform, thereby preventing occurrence of display unevenness and alignment defect, which have occurred to the conventional liquid crystal display devices incorporating the transflective layer 7 provided with the openings 29 as shown in FIG. 12, so that excellent display quality can be obtained.

As described in the foregoing, with the transflective liquid crystal display device described above, bright display in good contrast can be effected in the case of reflective display utilizing external light by the agency of the first polarizing film 11, the first optical compensatory element, and the liquid crystal element 20 incorporating the transflective layer 7 provided with the transparent portions 9. Further, because the second optical compensatory element the second polarizing film 17, and the backlight 16 are installed on the underside of the liquid crystal element 20, excellent transmissive display can be effected by lighting up the backlight 16 in an environment where external light is insufficient. Furthermore, in this case, transmissive display has little display unevenness, and is insusceptible to occurrence of alignment defect.

With the present embodiment, the STN liquid crystal element having a twist ankle of 240° is employed for the liquid crystal element 20, however, it is to be pointed out that a similar transflective liquid crystal display device can be made up even by use of a TN liquid crystal element having a twist angle of around 90°. In the case of effecting display on a large screen by employing the TN liquid crystal element, an active matrix liquid crystal display device incorporating active elements such as TFTs (Thin Film Transistor) or MIMs (Metal Insulator Metal) is preferably adopted.

Further, with the present embodiment, a film made of a polymer of liquid crystallinity with the twisted condition thereof fixed at room temperature is used for the twisted retardation film 12, however, with the use of a temperature compensatory twisted retardation film wherein parts of liquid crystal molecules are simply bonded to chain polymer molecules, having Rc varying in value depending on temperature, brightness and contrast are improved at high and low temperatures, so that a better transflective liquid crystal display device can be obtained.

With the present embodiment, a thin aluminum film is used for the transflective layer 7, however, a thin film made of metal, such as an aluminum alloy, tantalum, and so forth, can be used instead. Further, in order to improve reflectance of the transflective layer, and to protect the surface thereof, a multilayer film made of an inorganic oxide may be formed on the surface of the thin film made of metal after the formation of the transparent portions.

With the present embodiment, the transflective layer 7 is installed separately from the first electrodes 3, however, the first electrodes may be made up of the thin film made of metal, such as an aluminum alloy, tantalum, and so, forth, so as to function as reflective electrodes doubling as the transflective layer, thereby simplifying the construction of the liquid crystal element. Further, a similar advantageous effect can be obtained by installing the transflective layer 7 on the outside of the first substrate 1 although shadows occur to display.

Further, with the present embodiment, by use of the first substrate 1 having the surface to which the treatment for providing pits and projections is applied, the transflective layer 7 having scattering property is formed on the surface of the first substrate 1. However, it is also possible to form the transflective layer 7 having scattering property by applying a photosensitive protection film on top of the first substrate 1, forming a layer having pits and projections patterned in a desired shape by photoetching treatment, and forming a thin aluminum film thereon. Still further, a similar scattering effect can also be obtained by directly applying a protective film with fine particles mixed therein onto the transflective layer 7.

Second Embodiment: FIGS. 7 to 11

Figure 7:
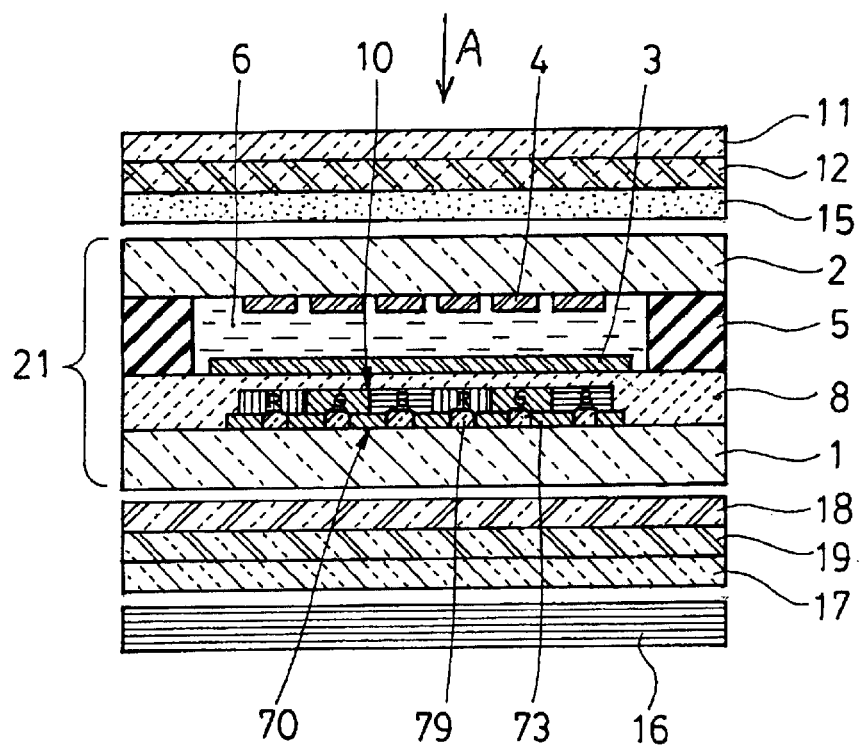
FIG. 7 is a schematic sectional view showing the constitution of a second embodiment of a transflective liquid crystal display device according to the invention.

Next, a second embodiment of a transflective liquid crystal display device according to the invention is described with reference to FIGS. 7 to 11. FIG. 7 is a schematic sectional view similar to FIG. 1, showing a constitution of the transflective liquid crystal display device.

Figure 8:
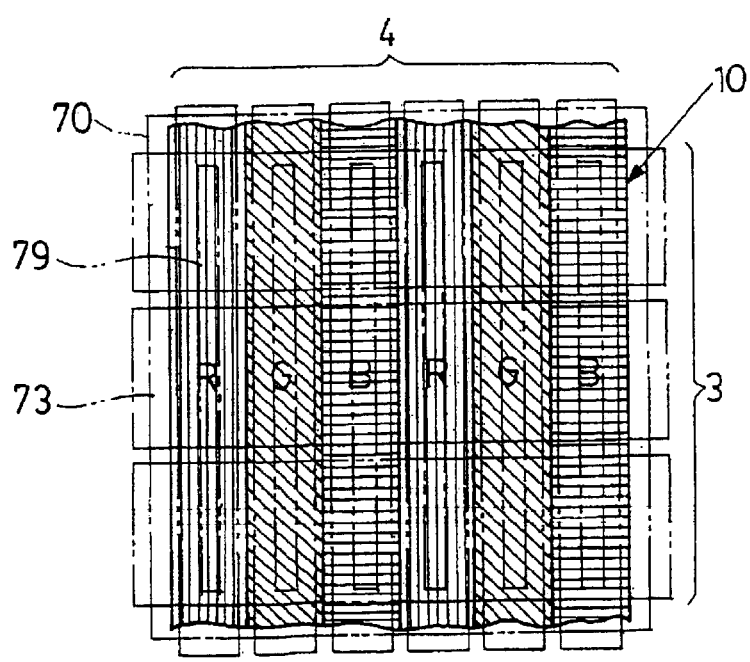
FIG. 8 is a plan view showing a color filter of the transflective liquid crystal display device shown in FIG. 7 together with a planar configuration thereof with a transflective layer, first electrodes, and second electrodes.
Figure 9:
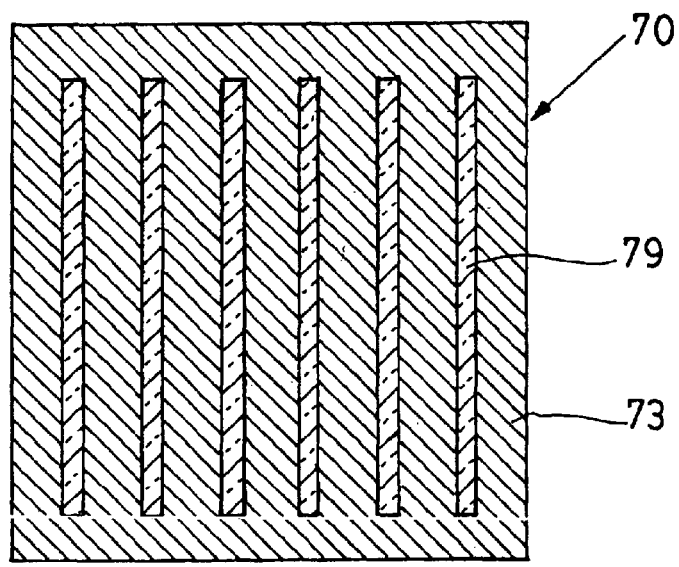
FIG. 9 is a plan view showing the transflective layer only of the transflective liquid crystal display device shown in FIG. 7.

FIG. 8 is a plan view showing a color filter of the transflective liquid crystal display device together with a planar configuration thereof with a transflective layer, first electrodes, and second electrodes, wherein the same hatches as those for respective colors in FIG. 7 are provided for clarity in illustration although FIG. 8 is not a sectional view. FIG. 9 is a plan view showing the transflective reflector only.

The transflective liquid crystal display device according to the second embodiment differs from that according to the first embodiment only in respect of the following points.

(1) A liquid crystal element is a liquid crystal element 21 provided with a color filter 10, thereby enabling color display to be effected.

(2) A first optical compensatory element disposed on the visible side of the liquid crystal element 21 is made up of only one sheet of a twisted retardation film 12.

(3) A light scattering layer 15 is installed on the outside of a second substrate 2 of the liquid crystal element 21.

(4) A second optical compensatory element disposed on the side of the liquid crystal element 21, opposite from the visible side thereof, is made up of a third retardation film 18 and a fourth retardation film 19.

(5) A transflective layer 70 is somewhat different in constitution from the transflective layer 7.

As shown in FIG. 7, the transflective liquid crystal display device according to the second embodiment is composed of the liquid crystal element 21, the light scattering layer 15, the twisted retardation film 12 which is the first optical compensatory element, and a first polarizing film 11, which are disposed on the visible side (the topside in FIG. 7, the arrow A indicating the direction of the visible side) of the liquid crystal element 21, the third retardation film 18 and the fourth retardation film 19, composing the second optical compensatory element, a second polarizing film 17, and a backlight 16, which are disposed on the side (the underside in FIG. 7) of the liquid crystal element 21, opposite from the visible side thereof.

The first polarizing film 11 and the twisted retardation film 12 are integrally joined together with an acrylic adhesive, and the twisted retardation film 12 is bonded to the upper face of the liquid crystal element 21 with a light scattering adhesive made of an acrylic adhesive with light scattering fine particles mixed therein, serving as the light scattering layer 15.

Further, the third retardation film 18, the fourth retardation film 19, and the second polarizing film 17 are also integrally joined together with an acrylic adhesive, and the third retardation film 18 is bonded to the underside of the liquid crystal element 21 with an acrylic adhesive.

As with the case of the liquid crystal element 20 according to the first embodiment, the liquid crystal element 21 is an STN liquid crystal element composed of a first substrate 1 and a second substrate 2, made up of a transparent class sheet of 0.5 mm thick, respectively, and coupled together with a sealant 5, keeping a predetermined spacing therebetween, and nematic liquid crystal 6 twisted 240° counterclockwise held in a gap between the first substrate 1 and the second substrate 2.

On the inner face of the first substrate 1 disposed on the side of the liquid crystal element 21, opposite from the visible side thereof, there are installed the transflective layer 70 made up of an aluminum film of 0.1 μm thick, a color filter 10 of 1 μm thick, made up of color filters in three colors that is, red filters R, green filters G, and blue filters B, disposed on the transflective layer 70, a protective film 8 of 2 μm thick made of an acrylic material, covering the transflective layer 70, and first electrodes 3 patterned in stripes, made of ITO which is a transparent and electrically conductive material. Further, on the inner face of the second substrate 2 disposed on the visible side of the liquid crystal element 21, there are formed second electrodes 4 also made of ITO, patterned in stripes in such a way as to cross the first electrodes 3 at right angles.

Crossover points of the first electrodes 3 and the second electrodes 4, opposed to each other, respectively, constitute respective pixels.

Because the transflective layer 70 according to the present embodiment is formed without applying a treatment for providing pits and projections to the first substrate, the surface thereof is specular without pits and projections having a light scattering effect. Accordingly, incident light undergoes regular reflection instead of being, reflected to the visual recognition direction, raising the possibility of causing dark display. For this reason, the light scattering layer 15; is installed on the outside (visible side) of the liquid crystal element 21.

The transflective laser 70 made up of a thin aluminum film is provided with transparent portions 79 made of aluminum oxide ($Al_2O_3$) formed by means of anodic oxidation, each formed in a slit shape, as shown in FIGS. 8 and 9. Each of the transparent portions 79 formed in the slit shape is formed at positions corresponding to the center widthwise of each of the second electrodes 4 so as to be in parallel therewith, and to extend in succession across a plurality of pixels (three pixels in this case). An area ratio of the transparent portions 79 is set to be equivalent to 20% of the total area of the transflective layer 70.

The color filter 10 is made up of the color filters in three colors, namely, the red filters R, the green filters G, and the blue filters B, and with the present embodiment, the filters in the respective colors are formed in longitudinal stripes parallel with the second electrodes 4, respectively, as shown in FIG. 8. The filters in the respective colors are formed to have a width wider than that of the respective second electrodes 4 such that no gap occurs therebetween. If there occurs a gap between the filters in the respective colors, composing the color filter 10, display will become brighter due to an increase in quantity of incident light, however, this is undesirable because a white light color is mixed in a color displayed, thereby degrading color purity.

In order to improve brightness, the maximum transmittance of the color filter 10 for a spectrum is preferably as high as possible, and the maximum transmittance of the filters in the respective colors of 80% or more, is preferable, the same of 90% or more being most preferable. Further, the minimum transmittance thereof for a spectrum needs to be rendered to be as high as 20° to 50%.

For the color filter 10, use can be made of a color filter of a pigment-suspended type, a dyed type, a printed type, a transfer type, an electrodeposition type, and so forth, however, the color filter of the pigment-suspended type, wherein pigment is kept in suspension in acrylic or PVA photosensitive resin, is most preferable because of its high heat resistant temperature and excellent color purity.

In order to obtain the color filters having such a high transmittance as described above, it is preferable to form the transflective layer 70 made up of a thin aluminum film on the first substrate 1, to form the transparent portions 79 in the transflective layer 70 by means of anodic oxidation, and subsequently, to form a thin oxide layer of aluminum oxide on top of an untransparent portion 73 as well by applying anodic oxidation again at a voltage in a range of 10 to 20V to the untransparent portion 73 for protection of aluminum in the course of a cleaning process and so forth.

The color filter 10 on the order of 1 μm in thickness, having a high transmittance, can be formed by applying a color resist prepared by mixing 10 to 15% of pigment with a photosensitive resin to the first substrate 1 by use of a spinner and by carrying out exposure and development processes.

For the first polarizing film 11 and the second polarizing film 17, the same material as that used in the case of the first embodiment is used. The twisted retardation film 12 has a twist angle Tc of 180°, and Rc of 0.68 μm, which is Δnd value. For the light scattering layer 15 which is a light scattering adhesive layer formed of an acrylic adhesive with light scattering fine particles mixed therein. EDA-1 (trade name) is used.

The third retardation film 18 is the same as that used in the first embodiment, and has at retardation value F1 of 0.14 μm, equivalent to a quarter wavelength, while the fourth retardation film 19 is also a transparent film of about 70 μm thick, formed by drawing polycarbonate (PC), and is set to have a retardation value F2 of 0.28 μm for light at a wavelength of 0.55 μm, equivalent to a half wavelength. By employing these two sheets of the retardation films, that is, the third retardation film 18 and the fourth retardation film 19, a broad band quarter-wavelength plate is constituted as with the case of the first embodiment wherein the twisted retardation film 12, the first retardation film 13, and the second retardation film 14 are employed as the first optical compensatory element.

For the backlight 16, an EL sheet emitting white light may be employed as with the case of the first embodiment, however, with the present embodiment, a side light type backlight which is an optical guide sheet with a white LED (light emitting diode) attached thereto is employed in order to lower power consumption and to enhance brightness.

Figure 10:
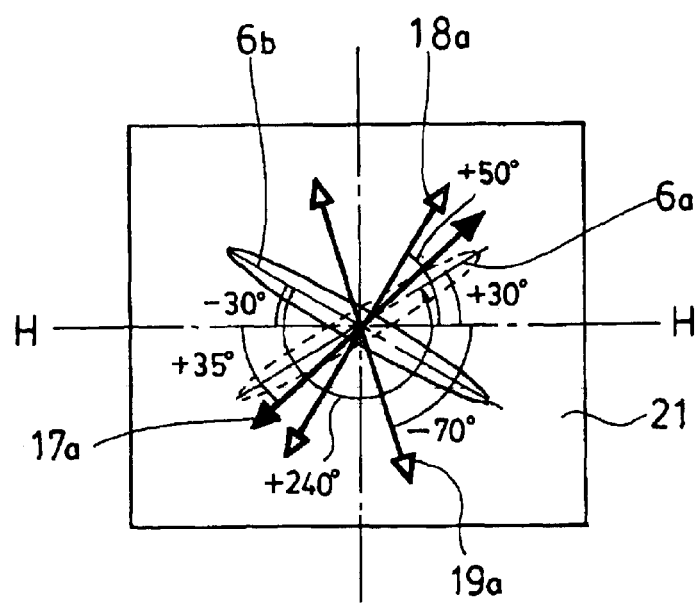
FIG. 10 is a schematic illustration showing a planar configuration among a liquid crystal element, a second polarizing film, a third retardation film, and a fourth retardation film of the transflective liquid crystal display device shown in FIG. 7.

Next, a planar configuration among respective constituent members of the liquid crystal display device according to the present embodiment is described hereinafter with reference to FIGS. 10 and 11. FIG. 10 shows the configuration between the liquid crystal element 21 and the constituent members disposed on the side (the underside in FIG. 7) of the liquid crystal element 21, opposite from the visible side thereof, and FIG. 11 shows the configuration of the constituent members disposed on the visible side (the topside in FIG. 7) of the liquid crystal element 21.

A configuration between an alignment direction 6a of liquid crystal molecules in the lower part of the nematic liquid crystal 6 of the liquid crystal element 21 and an alignment direction 6b of liquid crystal molecules in the upper part of the nematic liquid crystal 6 thereof, shown in FIG. 10, is the same as that for the first embodiment as described with reference to FIG. 5, and description thereof is therefore omitted.

A refractive indent difference Δn of the nematic liquid crystal 6 in use is 0.15, and a cell gap d, that is, a gap in which the nematic liquid crystal 6 is sandwiched between the first substrate 1 and the second substrate 2, is set at 5.4 μm. Accordingly, a value Rs to indicate birefringent tendency of the liquid crystal element 21 as expressed by Δnd, that is, the product of the refractive index difference Δn of the nematic liquid crystal 6 and the cell gap d, is 0.81 μm, thereby constituting an STN liquid crystal element having a twist angle Ts of 240°.

Figure 11:
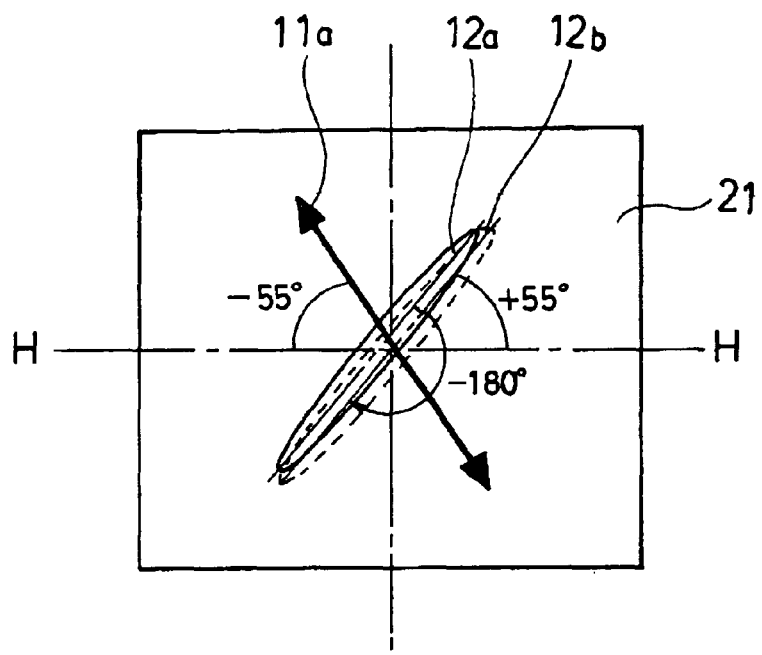
FIG. 11 is a schematic illustration similar to FIG. 10, showing a planar configuration between a first polarizing film and a twisted retardation film.

As shown in FIG. 11, the first polarizing film 11 is disposed such that a transmission axis 11a thereof is at an angle of −55° on the basis of the horizontal axis H—H of the liquid crystal element 21. The twisted retardation film 12 is disposed such that an alignment direction 12a of molecules in the lower part thereof is at an angle of +55° on the basis of the horizontal axis H—H, and an alignment direction 12b of molecules in the upper part thereof is also at an angle of +55°, so that a twist angle Tc thereof becomes −180° clockwise, and a twist angle ratio Tc/Ts is 0.75. If a difference in birefringent tendency is designated ΔR, ΔR=Rs−Rc=0.13 μm.

As shown in FIG. 10, the third retardation film 18 is disposed such that a phase delay axis 18a thereof is at an angle of +50° on the basis of the horizontal axis H—H of the liquid crystal element 21, and the fourth retardation film 19 is disposed such that a phase delay axis 19a thereof is at an angle of −70° of the basis of the horizontal axis H—H. As a result of disposing two sheets of the retardation films in this way, the third retardation film 18 and the fourth retardation film 19 constitute a broad band quarter-wavelength plate whose effective phase delay axis is at an angle of 80° relative to the horizontal axis H—H.

The second polarizing film 17 is disposed such that a transmission axis 17a thereof is at an angle of +35° relative to the horizontal axis H—H so as to cross the transmission axis 11a of the first polarizing film 11 at right angles.

Now, the operation principle of the present embodiment according to the invention is briefly described hereinafter.

First, reflective display is described. With the first embodiment, the twisted retardation film 12, the first retardation film 13, and the second retardation film 14 are employed as the first optical compensatory element, however, with the second embodiment, the twisted retardation film 12 only is employed as the first optical compensatory element. By optimizing the twist angle Tc the Δnd value (Rc), and the disposition angle of the twisted retardation film 12, however, a composite birefringent tendency of the twisted retardation film 12 and the nematic liquid crystal 6 becomes equivalent to a quarter wavelength, so that perfect black display can be effected in a condition where no voltage is applied to the nematic liquid crystal 6 as with the case of the first embodiment. On the other hand, in the ON condition where a voltage is applied to the nematic liquid crystal 6, white display can be effected, thereby enabling display in good contrast to be effected.

Then, by combining the ON condition with the OFF condition for respective display pixels, color display can be effected. For example, by turning a pixel corresponding to a red filter R into the ON condition while turning pixels corresponding to a green filter G, and a blue filter B, respectively, into the OFF condition, red display can be effected. Further, by turning pixels corresponding to a red filter R, and a green filter G, respectively, into the ON condition while turning a pixel corresponding to a blue filter B into the OFF condition, yellow display can be effected.

With the transflective liquid crystal display device according to the present embodiment, a high reflectance and a high contrast ratio of 10 or more are obtained, bright color display of high chroma can be effected even at the time of reflective display without lighting up the backlight 16.

Now, transmissive display when the backlight 16 is lit up is described hereinafter. Light emitted from the backlight 16 is turned into the light linearly polarized in the direction parallel to the transmission axis 17a of the second polarizing film 17 after passing therethrough. As previously described, the effective phase delay axis composed by the third retardation film 18 and the fourth retardation film 19 is at an angle of 80° relative to the horizontal axis H—H shown in FIG. 10, and the second polarizing film 17 is disposed such that the transmission axis 17a thereof is at an angle of +35° relative to the horizontal axis H—H. Consequently, the light linearly polarized enters at an angle of 45° relative to the effective phase delay axis, and is turned into circularly polarized light. About 80% of the circularly polarized light is reflected by the transflective layer 70, but remaining 20% thereof passes through the transparent portions 79.

In the portions of the nematic liquid crystal 6 of the liquid crystal element 21 where no voltage is applied, composite birefringent tendency by the twisted retardation film 12 and the liquid crystal element 21 is equivalent to a quarter wavelength, identical to a composite retardation value by the third retardation film 18 and the fourth retardation film 19, and these films are disposed such that the respective retardation values are subtracted from each other. Accordingly, the circularly polarized light passing through the transparent portions 79 of the transflective layer 70 reverts to the light linearly polarized in the direction parallel to the transmission axis 17a of the second polarizing film 17, and arrives at the first polarizing film 11. However, since the first polarizing film 11 is disposed such that the transmission axis 11a thereof is orthogonal to the transmission axis 17a of the second polarizing film 17, the linearly polarized light arrived at the first polarizing film 11 is absorbed thereby, thus effecting black display.

In the portions of the nematic liquid crystal 6 where a voltage is applied, liquid crystal molecules are caused to rise, and a retardation value comes to be provided between the fourth retardation film 19 and the twisted retardation film 12. As a result, the linearly polarized light which enters through the second polarizing film 17 is turned into elliptically polarized light, and arrives at the first polarizing film 11, thereby passing therethrough, so that white display is effected.

However, because the light emitted from the backlight passes through any one color filter of the color filter 10 when passing through the liquid crystal element 21 as described above, color display is effected.

Now, the advantageous effect of the transparent portions 79 of the transflective layer 70 is described hereinafter. Similarly to the case of the first embodiment, since the transflective layer 70 provided with the transparent portions 79 has flatness better than that of the transflective layer 27 provided with the openings 29 of the conventional liquid crystal display device as shown in FIG. 12, there is less display unevenness, and the liquid crystal element 21 becomes less susceptible to occurrence of alignment defect. Furthermore, by forming the respective transparent portions 79 in the slit shape, the width thereof can be rendered narrower than that of the respective transparent portions 9 of the transflective layer 7 according to the first embodiment, thereby further improving flatness.

Thus, with the transflective liquid crystal display device according to the second embodiment, color display in good contrast can be effected in the case of reflective display utilizing external light by the agency of the first polarizing film 11, the twisted retardation film 12, the light scattering layer 15, and the liquid crystal element 21 incorporating the transflective layer 70 provided with the transparent portions 79, and the color filter 10.

Further, since the third retardation film 18 and the fourth retardation film 19, the second polarizing film 17, and the backlight 16 are installed on the underside of the liquid crystal element 21, excellent transmissive display can be effected by lighting up the backlight 16 in an environment where external light is insufficient. In addition, there is less display unevenness, and alignment defect and so forth are unlikely to occur.

With the present embodiment, one sheet of the twisted retardation film 12 is employed as the first optical compensatory element, however, the twisted retardation film, and the first and second retardation film may be employed as with the first embodiment, or one sheet of retardation film, or a plurality of sheets of retardation films may be employed instead of employing the twisted retardation film. With a transflective liquid crystal display device similar in constitution to the present embodiment of the invention, two sheets of retardation films, namely, one having a retardation value of 0.2 μm and the other having a retardation value of 0.4 μm, were employed as a first optical compensatory element, and a first polarizing film 11 was disposed such that a transmission axis 11a thereof is at an angle of −50° relative to the horizontal axis H—H, whereupon bright reflective display in high contrast was effected.

With the present embodiment, the third retardation film 18 and the fourth retardation film 19 are installed as the second optical compensatory element, however, even if only the third retardation film 18 is installed as with the first embodiment, excellent color display can be effected although contrast in the case of transmissive display will somewhat deteriorate.

Further, with the present embodiment, the color filter 10 is installed on the side of the first substrate 1, however, the color filter 10 can be formed between the second electrodes 4 and the second substrate 2, on the inner side of the second substrate 2. However, the color filter 10 is preferably installed on the side of the first substrate 1 because the protective film 8 employed for planarization of the color filter 10 can double as an insulation layer between the transflective layer 70 and the first electrodes 3.

Still further, with the present embodiment, the color filters in three colors of red, green, and blue are used for the color filter 10, however, similar bright color display can be effected by use of color filters in three colors of cyan, yellow, and magenta.

Furthermore, with the present embodiment, the surface of the thin aluminum film of the untransparent portion 73 of the transflective layer 70 is inactivated by applying anodic oxidation thereto so as to withstand stress incurred at a cleaning line in the process of fabricating the color filter, however, after the formation of the transparent portions 79, a transparent thin film composed of $SiO_2$, and so forth can be formed on the thin aluminum film by the sputtering method or the CVD method.

Further, with the present embodiment, the light scattering adhesive layer made of the adhesive with the light scattering fine particles mixed therein is employed as the light scattering layer 15, however, a film type light scattering layer, a photopolymer scattering layer, and so forth may be employed instead.

Still further, with the present embodiment, the light scattering layer 15 is installed between the liquid crystal element 21 and the twisted retardation film 12, however, the same may be installed anywhere between the liquid crystal element 21 and the first polarizing film 11. Nevertheless, the light scattering layer 15 is preferably installed as close to the liquid crystal element 21 as possible because there will be less defocus of characters by so doing.

Yet further, with the present embodiment, the light scattering layer 15 is disposed on the outside of the liquid crystal element 21, however, as with the case of the first embodiment, by use of a transflective layer having scattering property, excellent color display can be effected even without the light scattering layer installed separately.

What is claimed is:

1. A transflective liquid crystal display device comprising a liquid crystal element composed of liquid crystal sandwiched between a first substrate and a second substrate, and a transflective layer installed on an inside of the first substrate,
   wherein the transflective layer includes transparent portions for transmitting light and an untransparent portion surrounding the transparent portions, wherein the untransparent portion is a thin metal film and the transparent portions are an oxide film of a thin metal film.

2. A transflective liquid crystal display device according to claim 1, further comprising a first polarizing film disposed on an outside of the second substrate of the liquid crystal element, a second polarizing film and a backlight, disposed in sequence on an outside of the first substrate.

3. A transflective liquid crystal display device according to claim 2, wherein the transflective layer and first electrodes are disposed on an inner face of the first substrate, second electrodes are disposed on an inner face of the second substrate, the liquid crystal is nematic liquid crystal of twisted alignment, a first optical compensatory element is disposed between the first polarizing film and the second substrate, and a second optical compensatory element is disposed between the first substrate and the second polarizing film.

4. A transflective liquid crystal display device according to claim 3, wherein the nematic liquid crystal is supertwisted nematic liquid crystal having a twist angle in a range of 180 to 260°.

5. A transflective liquid crystal display device according to claim 1, wherein pits and projections are provided on a surface of the untransparent portion of the transflective layer, thereby forming a scattering layer.

6. A transflective liquid crystal display device according to claim 1, wherein a scattering layer is installed on an outside of the second substrate of the liquid crystal element.

7. A transflective liquid crystal display device according to claim 3, wherein the first optical compensatory element is composed of one sheet of retardation film, or a plurality of sheets of retardation films.

8. A transflective liquid crystal display device according to claim 3, wherein the first optical compensatory element is composed of a twisted retardation film.

9. A transflective liquid crystal display device according to claim 3, wherein the first optical compensatory element is composed of a twisted retardation film, and one sheet of retardation film or a plurality of sheets of retardation films.

10. A transflective liquid crystal display device according to claim 1, wherein color filters in a plurality of colors are installed on either the first substrate or the second substrate of the liquid crystal element.

11. A transflective liquid crystal display device according to claim 1,
    wherein the oxide film of the thin metal film is an aluminum oxide.

12. A transflective liquid crystal display device according to claim 1, wherein an oxide film of a thin metal film is provided on the thin metal film of the untransparent portion.

13. A transflective liquid crystal display device according to claim 4, wherein crossover points of the first electrodes and the second electrodes, opposed to each other, inside the liquid crystal element constitute respective pixels, and the transparent portions of the transflective layer are provided at positions corresponding to the respective pixels.

14. A transflective liquid crystal display device according to claim 13, wherein an area ratio of the transparent portions to the transflective layer is in a range of 5 to 30%.

15. A transflective liquid crystal display device according to claim 13, wherein each of the transparent portions of the transflective layer is formed in a slit shape at a position corresponding to a plurality of the pixels in succession.

16. A transflective liquid crystal display device according to claim 15, wherein an area ratio of the transparent portions to the transflective layer is in a range of 5 to 30%.

17. A transflective liquid crystal display device according to claim 1, wherein a protective film formed of a transparent and insulating material is installed for covering the transflective layer on the first substrate of the liquid crystal element.

18. A transflective liquid crystal display device according to claim 3, wherein a protective film formed of a transparent and insulating material is installed between the transflective layer and the first electrodes, on the first substrate of the liquid crystal element.

* * * * *